United States Patent
Tian et al.

(10) Patent No.: US 8,047,296 B2
(45) Date of Patent: Nov. 1, 2011

(54) METHOD OF TRANSITIONING TO KINETIC HYDRATE INHIBITORS IN MULTIPLE TIE-IN WELL SYSTEMS

(75) Inventors: Jun Tian, League City, TX (US); Timothy Z. Garza, Dickinson, TX (US)

(73) Assignee: Baker Hughes Incorporated, Houston, TX (US)

( * ) Notice: Subject to any disclaimer, the term of this patent is extended or adjusted under 35 U.S.C. 154(b) by 231 days.

(21) Appl. No.: 12/507,341

(22) Filed: Jul. 22, 2009

(65) Prior Publication Data
US 2010/0018712 A1    Jan. 28, 2010

Related U.S. Application Data

(60) Provisional application No. 61/083,671, filed on Jul. 25, 2008.

(51) Int. Cl.
*E21B 41/00* (2006.01)
*E21B 43/01* (2006.01)
*C09K 8/52* (2006.01)

(52) U.S. Cl. ....... 166/366; 137/13; 166/244.1; 166/310; 507/90; 507/266

(58) Field of Classification Search ............... None
See application file for complete search history.

(56) References Cited

U.S. PATENT DOCUMENTS

| | | | | |
|---|---|---|---|---|
| 5,880,319 | A * | 3/1999 | Sloan, Jr. | 585/15 |
| 6,093,862 | A * | 7/2000 | Sinquin et al. | 585/15 |
| 7,638,465 | B2 * | 12/2009 | Rivers et al. | 507/90 |
| 2005/0081432 | A1 | 4/2005 | Panchalingam et al. | |
| 2005/0261529 | A1 | 11/2005 | Crosby et al. | |
| 2006/0009363 | A1 * | 1/2006 | Crews | 507/100 |
| 2006/0223713 | A1 | 10/2006 | Pakulski et al. | |
| 2008/0032902 | A1 * | 2/2008 | Rivers et al. | 507/202 |
| 2009/0124520 | A1 * | 5/2009 | Tohidi | 507/90 |
| 2009/0325823 | A1 * | 12/2009 | Pakulski et al. | 507/90 |
| 2010/0193194 | A1 * | 8/2010 | Stoisits et al. | 166/335 |

FOREIGN PATENT DOCUMENTS
WO    2008017018 A2    2/2008

* cited by examiner

*Primary Examiner* — George Suchfield
(74) *Attorney, Agent, or Firm* — Mossman Kumar & Tyler PC

(57) ABSTRACT

The technical challenges for a smooth transition between using both a thermodynamic hydrate inhibitor (THI) and a kinetic hydrate inhibitor (KHI) to simply using only the KHI in multiple tie-in gas natural gas production systems is solved by adding more THI in a first pipeline leg of the production system while ceasing adding THI in a second pipeline leg of the system. Further, more KHI is added into the second leg of the system, and subsequently THI is gradually and/or slowly reduced in the remaining legs of the system until only KHI is being injected, after which the KHI amount in all legs may be reduced to the equilibrium or steady-state levels.

11 Claims, 3 Drawing Sheets

METHOD OF TRANSITIONING TO KINETIC HYDRATE INHIBITORS IN MULTIPLE TIE-IN WELL SYSTEMS

CROSS-REFERENCE TO RELATED APPLICATION

This application claims the benefit of U.S. Provisional Application Ser. No. 61/083,671 filed Jul. 25, 2008.

TECHNICAL FIELD

The invention relates to methods for the prevention and inhibition of hydrocarbon hydrates in pipelines, and most particularly relates, in one non-limiting embodiment, to methods for transitioning from injecting a combination of hydrate inhibitors in a pipeline to injecting only one type of inhibitor into the pipeline.

BACKGROUND

A number of hydrocarbons, especially lower-boiling light hydrocarbons, in formation fluids or natural gas are known to form hydrates in conjunction with the water present in the system under a variety of conditions—particularly at a combination of lower temperature and higher pressure. The hydrates usually exist in solid forms that are essentially insoluble in the fluid itself. As a result, any solids in a hydrocarbon or natural gas fluid are at least a nuisance for production, handling and transport of these fluids. It is not uncommon for hydrate solids (or crystals) to cause plugging and/or blockage of pipelines or transfer lines or other conduits, valves and/or safety devices and/or other equipment, resulting in shutdown, loss of production and, more seriously, risk of explosion, compromised safety of operating personnel and unintended release of hydrocarbons into the environment either on-land or off-shore. Accordingly, hydrocarbon hydrates have been of substantial interest as well as concern to many industries, particularly the petroleum and natural gas industries.

Hydrocarbon hydrates are clathrates, and are also referred to as inclusion compounds. Clathrates are cage structures formed between a host molecule and a guest molecule. A hydrocarbon hydrate generally is composed of crystals formed by water host molecules surrounding the hydrocarbon guest molecules. The smaller or lower-boiling hydrocarbon molecules, particularly $C_1$ (methane) to $C_4$ hydrocarbons and their mixtures, are more problematic because it is believed that their hydrate or clathrate crystals are easier to form. For instance, it is possible for ethane to form hydrates at as high as 4° C. at a pressure of about 1 MPa. If the pressure is about 3 MPa, ethane hydrates can form at as high a temperature as 14° C. Even certain non-hydrocarbons such as carbon dioxide, nitrogen and hydrogen sulfide are known to form hydrates under the proper conditions. Hydrate-forming guest molecules include, but are not necessarily limited to, methane, ethane, ethylene, acetylene, propane, propylene, methylacetylene, n-butane, isobutane, 1-butene, trans-2-butene, cis-2-butene, isobutene, butene mixtures, isopentane, pentenes, natural gas, carbon dioxide, hydrogen sulfide, nitrogen, oxygen, argon, krypton, and xenon.

There are two broad chemical techniques to overcome or control the hydrocarbon hydrate flow hazards, namely thermodynamic and kinetic. The thermodynamic approach is to prevent hydrate formation by addition of "antifreeze" to the production fluids. Suitable thermodynamic hydrate inhibitors include, but are not necessarily limited to, methanol (MeOH), monoethylene glycol (MEG), diethylene glycol (DEG), triethylene glycol (TEG), propylene glycol (PG), certain salts, and mixtures thereof.

The kinetic approach generally attempts (a) to prevent the smaller hydrocarbon hydrate crystals from agglomerating into larger ones (known in the industry as an anti-agglomerate and abbreviated AA) and/or (b) to inhibit, retard and/or prevent initial hydrocarbon hydrate crystal nucleation; and/or crystal growth (known in the industry as a kinetic hydrate inhibitor and abbreviated KHI). Thermodynamic and kinetic hydrate control methods may be used in conjunction.

Kinetic efforts to control hydrates have included the use of different materials as inhibitors. For instance, onium compounds with at least four carbon substituents are used as AA to inhibit the plugging of conduits by gas hydrates. Additives such as polymers with lactam rings have also been employed as KHI to control clathrate hydrates in fluid systems. All these kinetic inhibitors are commonly labeled as Low Dosage Hydrate Inhibitors (LDHI) in the art. KHIs and even LDHIs are relatively expensive materials, and it is always advantageous to determine ways of lowering the usage levels of these hydrate inhibitors while maintaining effective hydrate inhibition. Other suitable KHIs include, but are not necessarily limited to, dendrimeric compounds, hyperbranched polymers, and linear polymers and copolymers. Dendrimeric compounds have also been referred to as "starburst conjugates". Such compounds are described as being polymers characterized by regular dendrimeric (tree-like) branching with radial symmetry. Suitable but non-restrictive examples of dendrimeric compounds include HYBRANE® polymers available from DSM. One suitable, but non-limiting linear polymer is polyvinylcaprolactam (PVCap). Suitable onium compounds include, but are not limited to, ammonium compounds, and phosphonium compounds, including, but not necessarily limited to those of U.S. Patent Application Publication 2005/0261529 A1, incorporated herein in its entirety by reference.

In the production of hydrocarbons, particularly natural gas, it is common for a wellhead platform (WHP) to be offshore and transport hydrocarbon through a subsea production pipeline "leg" which may join one or more other legs forming a larger pipeline to take the gas to another offshore facility, such as a slug catcher or the like. When the larger pipeline is submerged in the sea, the combination of lower temperatures with high pressures make the pipeline susceptible to gas hydrate formation which may cause the transport problems discussed above. It will be remembered that the flow in a hydrate-susceptible pipeline is multiphase that is both gas phase and liquid phase water and hydrate-forming guest molecules are present.

It is complicated if two or more hydrocarbon production pipeline legs join together to form the subsea pipeline that is susceptible to hydrate formation. It is not a simple matter to adjust the hydrate inhibitor in each leg that joins the subsea pipeline because the combined effect of the types and amounts of hydrate inhibitors may nor may not continue to inhibit hydrates. Further, when the sea temperature drops seasonally, while more of the present hydrate inhibitor may be used, and/or an additional hydrate inhibitor is injected, when warmer weather resumes and the sea gradually warms up it is not a simple or easy matter to then reduce the amounts and types of hydrate inhibitors used. That is, due to complex interactions of different additive types, as will be further explained below, reducing the THI and KHI to levels previously effective may, in fact, not be sufficiently effective, and may actually increase the tendency of hydrates to form. Because hydrate inhibitors are generally expensive, operators have an economic incentive not to use any more inhibitor than necessary. In a multiple tie-in well system (two or more hydrocarbon production pipeline legs joining a sub-sea hydrate-susceptible pipeline), it is often not apparent how to reduce the amounts and types of hydrate inhibitors used without incurring an increased risk of hydrate formation. Assuring smooth flow in these pipelines is very important since interruptions in flow can incur costs of millions of dollars.

Thus, it is desirable that new methods of transitioning between using multiple types of hydrate inhibitors in pipelines to using just one hydrate inhibitor be developed so that effective levels of hydrate inhibition may be maintained while using a minimum amount of hydrate inhibitor to reduce additive costs.

SUMMARY

There is provided, in one form, a method for transitioning from introducing both a thermodynamic hydrate inhibitor (THI) and a kinetic hydrate inhibitor (KHI) in a hydrate-susceptible pipeline to introducing only a KHI alone in the hydrate-susceptible pipeline, particularly in a system that has a first hydrocarbon production pipeline leg from a first wellhead to a joint on the hydrate-susceptible pipeline and a second hydrocarbon production pipeline leg from a second wellhead to the same or different joint on the hydrate-susceptible pipeline at a joint (which could be the same joint). The method involves injecting a first amount of THI into both the first and second hydrocarbon production pipeline legs. All hydrate inhibitor injections are continuous unless otherwise noted. Further, all hydrate inhibitor injections and introductions may be gradual or relatively quick or abrupt; the rate at which flows, injections and introductions are made or ceased may be determined empirically. A first amount of KHI is injected into both the first and second hydrocarbon production pipeline legs. Subsequent to the injecting of THI and KHI mentioned earlier (which may occur in any order), the amount of THI injected into the first hydrocarbon production pipeline leg is increased to a second amount of THI that is at least twice that of the first amount of THI while ceasing injecting THI into the second hydrocarbon production pipeline leg. This injection ceasing may be gradual or relatively quick. The amount of KHI injected into the second hydrocarbon production pipeline leg increases to a second amount of KHI that is at least twice that of the first amount of KHI while the amount of THI injecting into the first hydrocarbon production pipeline leg is slowly reduced at a rate effective to not cause hydrate formation in the hydrate-susceptible pipeline until the amount of THI injected is zero. The method also involves reducing the amount of KHI injected into both hydrocarbon production pipeline legs until a relatively constant amount or proportion is reached that prevents hydrate formation in the hydrate-susceptible pipeline. In a particularly suitable embodiment, the hydrocarbon is natural gas. By "relatively constant" is meant that relative to the gradual increase or decrease the amount of KHI (or other inhibitor) stays the same, in one non-limiting example within 1 or 2 vol %. This amount may also be called a comparatively constant amount, a stable dosage or a substantially stable amount.

In another non-limiting embodiment herein, there is provided a method for transitioning from introducing both a THI and a KHI in a hydrate-susceptible pipeline to introducing only a KHI in the hydrate-susceptible pipeline, in a system that has a shorter hydrocarbon production pipeline leg from a first wellhead to a joint on the hydrate-susceptible pipeline and a relatively longer hydrocarbon production pipeline leg from a second wellhead to the joint on the hydrate-susceptible pipeline at a joint (which again may be the same joint). The method involves injecting a first amount of THI into both the shorter and longer hydrocarbon production pipeline legs while prior thereto, simultaneously therewith or subsequent to, injecting a first amount of KHI into both the shorter and longer hydrocarbon production pipeline legs. Then the amount of THI injecting into the shorter hydrocarbon production pipeline leg is increased to a second amount of THI that is at least twice that of the first amount of THI while gradually ceasing injecting THI into the longer hydrocarbon production pipeline leg. Next, the amount of KHI injecting into the longer hydrocarbon production pipeline leg is increased to a second amount of KHI that is at least twice that of the first amount of KHI while reducing the amount of THI injecting into the shorter hydrocarbon production pipeline leg slowly at a rate effective to not cause hydrate formation in the hydrate-susceptible pipeline until the amount of THI injected is zero. Finally, the amount of KHI injected into both hydrocarbon production pipeline legs is reduced until a steady amount is reached that prevents hydrate formation in the hydrate-susceptible pipeline.

Figure 1:
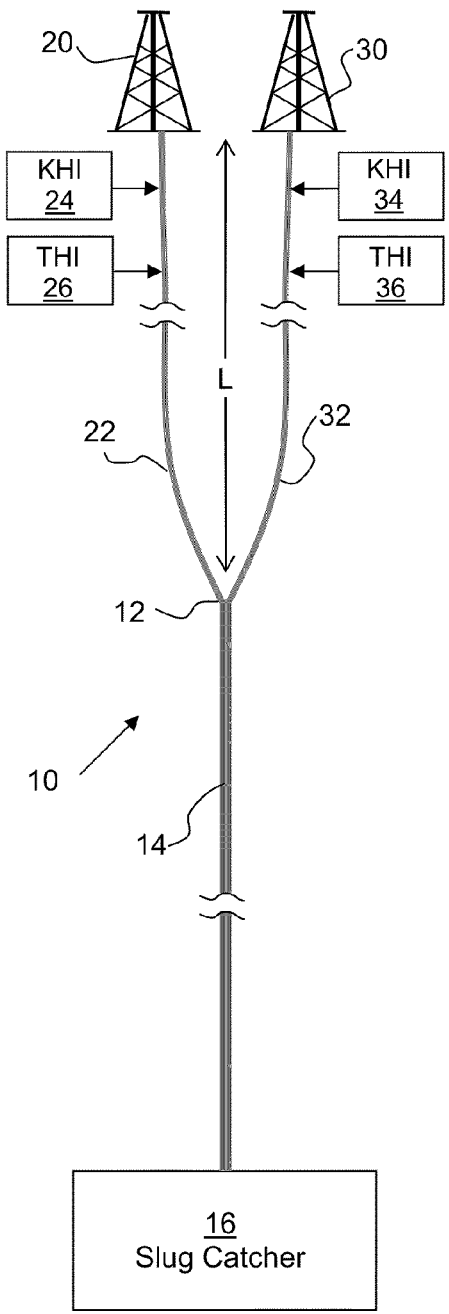
FIG. 1 is a schematic illustration of one embodiment of an offshore gas production and pipeline system where there are two wellhead platforms and the hydrocarbon production pipeline legs from each platform to the tie-in are approximately the same.
Figure 2:
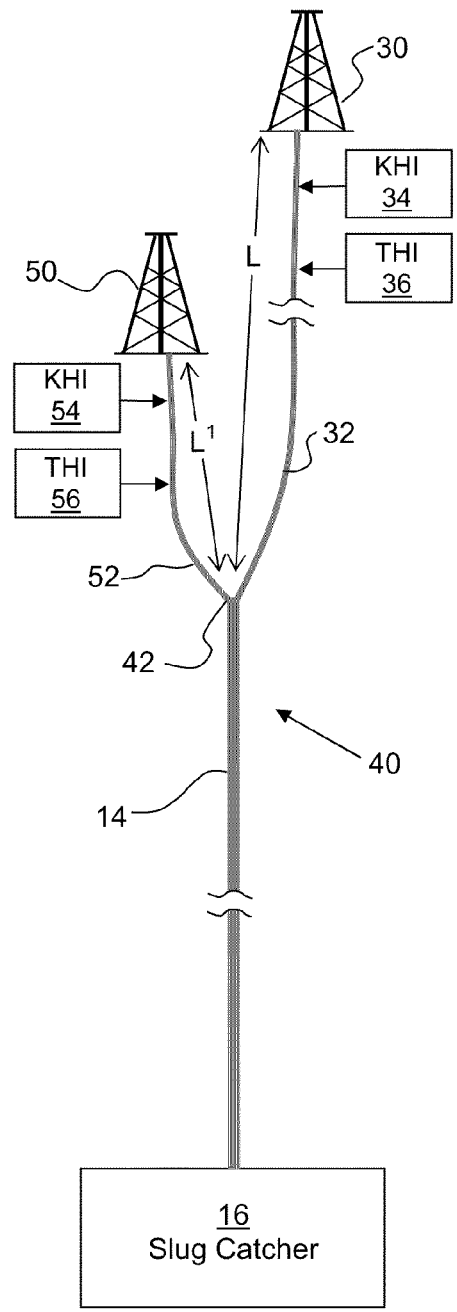
FIG. 2 is a schematic illustration of another embodiment of an offshore gas production and pipeline system where there are two wellhead platforms and the hydrocarbon production pipeline legs from each platform to the tie-in are of considerably different lengths.

It will be appreciated that FIGS. 1 and 2 are schematic illustrations that are not to scale and very simplified to emphasize the important features of the method described herein.

DETAILED DESCRIPTION

Apparatus and methods will be described herein for inhibiting, retarding, mitigating, reducing, controlling and/or delaying formation of hydrocarbon hydrates or agglomerates of hydrates in various fluids, such as those used in hydrocarbon recovery operations and in other applications, particular during transitions of different combinations of types of hydrate inhibitors in multiple tie-in well systems. Such compositions and methods may be applied to prevent or reduce or mitigate plugging of annular spaces, pipes, transfer lines, valves, and other places or equipment downhole where hydrocarbon hydrate solids may form under conditions conducive to their formation or agglomeration.

The term "inhibiting" is used herein in a broad and general sense to mean any improvement in preventing, controlling, delaying, reducing or mitigating the formation, growth and/or agglomeration of hydrocarbon hydrates, particularly light hydrocarbon gas hydrates in any manner, including, but not limited to kinetically, thermodynamically, by dissolution, by breaking up, by anti-agglomeration, by other mechanisms, or any combination thereof. Although the term "inhibiting" is not intended to be restricted to the complete cessation of gas hydrate formation, it may include the possibility that formation of any gas hydrate is entirely prevented. For instance, it is entirely possible that gas hydrates are formed, but are of such small size and/or in such small quantities as to not appreciably or problematically inhibit flow or transport through a pipeline.

The terms "formation" or "forming" relating to hydrates are used herein in a broad and general manner to include, but are not limited to, any formation of hydrate solids from water and hydrocarbon(s) or hydrocarbon and non-hydrocarbon gas(es), growth of hydrate solids, agglomeration of hydrates, accumulation of hydrates on surfaces, any deterioration of hydrate solids plugging or other problems in a system and combinations thereof.

The term "low dosage" used with respect to low dosage hydrate inhibitors (LDHIs) as defined herein refers to volumes of less than 5 weight % (wt %) of the aqueous fluids present. In some non-limiting embodiments, the wt % for thermodynamic hydrate inhibitors may be considerably higher, which depends on both the system sub-cooling and hold time.

The present apparatus and methods may be useful for inhibiting hydrate formation for many hydrocarbons particularly including hydrocarbon and non-hydrocarbon mixtures. The method is expected to be particularly useful for inhibiting or preventing hydrates involving lighter or low-boiling, $C_1$-$C_5$, hydrocarbon gases, non-hydrocarbon gases or gas mixtures at hydrate-forming conditions. Examples of such gases include, but are not necessarily limited to, methane, ethane, ethylene, acetylene, propane, propylene, methylacetylene, n-butane, isobutane, 1-butene, trans-2-butene, cis-2-butene, isobutene, butene mixtures, isopentane, pentenes (including mixtures of pentenes), natural gas, carbon dioxide, hydrogen sulfide, nitrogen, oxygen, argon, krypton, xenon, and mixtures thereof. These molecules are also termed hydrate-forming guest molecules herein. Other examples include various natural gas mixtures that are present in many gas and/or oil formations and natural gas liquids (NGL). The hydrates of all of these low-boiling hydrocarbons are also referred to as gas hydrates. The hydrocarbons may also comprise other compounds including, but not limited to CO, $CO_2$, COS, hydrogen, hydrogen sulfide ($H_2S$), and other compounds commonly found in gas/oil formations or processing plants, either naturally occurring or used in recovering/processing hydrocarbons from the formation or both, and mixtures thereof.

Other suitable gas hydrate inhibitors herein, besides those mentioned in the Background, may include, but are not necessarily limited to, known gas hydrate inhibitors, in particular LDHIs (in contrast to thermodynamic inhibitors such as salts or glycols), including, but not limited to cationic, anionic, amphoteric, and non-ionic LDHIs. Alternatively, the LDHI may be a kinetic hydrate inhibitor in one non-limiting embodiment, as opposed to anti-agglomerates. Often however, as will be described, both LDHIs and thermodynamic inhibitors are used together.

Because some of the gas hydrate inhibitors mentioned herein will be solids or gummy-like amorphous organic materials under ambient conditions, it is often helpful to use a suitable solvent in the composition to be injected. This allows the formation of a homogeneous or uniform solution, suspension, emulsion or a combination of these, of all the components for easier mixing or distributing or dispersing the composition in the hydrocarbon/water production fluid or system to be treated. As a result, more efficient and/or favorable contacting of the composition with the mixture comprising water and the hydrate-forming guest molecules can be effected. Suitable solvents for gas hydrate inhibitors may include, but are not limited to, at least one oxygenated compound selected from $C_1$-$C_6$ alcohols, $C_2$-$C_6$ glycols, $C_1$-$C_6$ mono-aliphatic, in a non-limiting example mono-alkyl, ethers of $C_2$-$C_6$ glycols, glycerin, $C_1$-$C_6$ mono-aliphatic, in a non-restrictive alternative mono-alkyl, ethers of glycerin, $C_1$-$C_6$ di-aliphatic ethers of, also dialkyl, ethers of glycerin, glycerin esters of $C_1$-$C_6$ carboxylate; tetrahydrofuran; N-methylpyrrolidone; sulfolane; $C_3$-$C_{10}$ ketones, and mixtures thereof. Examples of acceptable solvents in one non-limiting embodiment include water and liquid oxygenated materials such as methanol, ethanol, propanol, glycols like ethylene glycol, 1,2-propylene glycol, 1,3-propylene glycol, glycerin, esters and ethers of glycerin, CELLOSOLVE® (2-ethoxyethanol), CELLOSOLVE derivatives, 2-propoxyethanol, 2-isopropoxyethanol, 2-butoxyethanol, 2-isobutoxyethanol, 2-methoxyethanol, ethoxylated propylene glycols, ketones such as cyclohexanone and diisobutylketone, and mixtures thereof. The solvent may be present in the total hydrocarbon hydrate inhibiting composition in the range of from 0 wt % to about 95 wt %, in another non-restrictive embodiment from about 0 wt % to about 85 wt %, of the total composition, based on volume. CELLOSOLVE is a registered trademark of Union Carbide Corporation.

As previously described, it has been found that in the pumping of hydrocarbons, particularly natural gas, over multiple tie-in well systems, there can be difficulties in transitioning from using more than one type of hydrate inhibitor to only one inhibitor type. Typically, such systems may operate for months during relatively warm or mild weather conditions using only a continuous injection of a relatively constant amount or proportion of KHI into the gas production pipeline legs at the wellhead platform (WHP) to prevent hydrate formation both in the production pipeline leg and after the leg ties-in to a larger pipeline that may be more susceptible to hydrate formation, for instance because it is deeper or otherwise exposed to colder subsea conditions for longer periods. The amount of KHI must be effective to prevent hydrate formation after the pipeline reaches the lower critical solution temperature (LSCT) for the KHI.

When sea temperatures drop, such as during season changes during the winter, the steady-state or equilibrium level of KHI may be inadequate to fully prevent or inhibit gas hydrate formation and it may be necessary to inject a THI into the hydrocarbon production pipeline leg as well as the KHI to effectively inhibit hydrate formation in the pipelines. While adding another type of hydrate inhibitor is not particularly desirable for economic reasons, it is necessary to maintain production flow through the pipelines.

As the seasons change back to warmer or milder conditions and the sea is not as cold, conditions may be favorable for returning to using only KHI instead of both THI and KHI to prevent or inhibit hydrate formation, thereby saving the cost of injecting the THI.

Where there are multiple WHPs and multiple hydrocarbon production pipeline legs, the injection of THI and KHI ultimately becomes part of the larger pipeline and the amounts and types of THI and KHI injected into the various legs can complexly and adversely affect the ability to prevent or inhibit hydrates in the ultimate, larger pipeline. For instance, it has been discovered that the active components of KHI may precipitate or accumulate on carbon steel at a specific section of the pipelines under certain conditions. Furthermore, the accumulated active components would be washed away by THI during its injection. The precipitation will re-occur during the attempted transition from pulling off THI and leaving KHI alone into the gas production pipeline legs. It is apparent that precipitating, accumulating or association of the KHI active components onto carbon steel is not desirable because the active components cannot be delivered and then subsequently prevent or inhibit gas hydrate formation downstream from the point of deposition or accumulation.

It has been further discovered that the factors involved in causing the active components to precipitate onto carbon steel include, but are not necessarily limited to, the type and proportion of phases in the pipeline, the solubility of the various hydrate inhibitors—which changes with the proportions of the components in the pipeline, the type and proportion of each hydrate inhibitor, the composition and temperature of condensate, the temperature of the pipeline components (sectors), the amount of water in the pipeline flow, and the liquid production rates and pipeline size, etc.

Without wishing to be bound by any particular explanation or theory, it is possible that the active components of a KHI precipitate, deposit and absorb onto certain portions of the pipeline, specifically a carbon steel pipeline, but are then re-dissolved or otherwise taken back up into the flow at later times or as conditions change. In some cases a THI may facilitate the KHI active components dissociation from the flow and onto the carbon steel, while in other cases, a THI may impede the KHI active components dissociation from the flow and onto the carbon steel. Certain THIs such as methanol (MeOH) and monoethylene glycol (MEG) alone or together may serve as a solvent for some KHIs, but not for other KHI types. For instance, it has been found that in some proportions and at some temperatures, a high MeOH concentration in MEG has an effect on KHI solubility when the MEG concentration in the water present is high, but that the MeOH concentration shows little effect when the MeOH contents are low. It has been found that generally higher temperatures cause higher accumulation of the KHI active components on carbon steel, which may help explain why it is difficult to switch or transition from using both a THI and a KHI to injecting only a KHI as wellhead temperature is high. Further, a higher MEG concentration may lead to lower active components accumulation, although the temperature effect may be different under the same testing conditions. The presence of hydrocarbon has been found to not change the patterns previously observed when hydrocarbon presence was not taken into account. Additionally, the water cut (proportion of water) has much less effect on KHI active component accumulation tendency when compared to the effects of temperature and MEG concentration. It has been found that a higher MeOH concentration leads to a lower accumulation of KHI active components as compared with MEG concentration.

A particular method has been discovered as useful in switching or transitioning between injecting both a THI and a KHI in a multiple tie-in system to injecting only KHI in such a system, as will be described with reference to FIG. 1 in which the overall multiple tie-in pipeline system is referred to as 10. FIG. 1 schematically shows first and second wellhead platform (WHP) or simply wellhead 20 and 30, respectively, having a first hydrocarbon production pipeline leg 22 and second hydrocarbon (e.g. gas) production pipeline leg 32, respectively, for transporting gas (or other hydrocarbon) from the WHPs to a tie-in point 12 of a larger, hydrate-susceptible pipeline 14 that goes to a central facility such as a slug catcher 16. In FIG. 1, the gas production pipeline legs 22 and 32 are approximately the same length L. Each gas production pipeline leg 22 and 32 have their own injection of KHI 24 and 34 and THI 26 and 36 respectively. It will be appreciated that these hydrate inhibitors may be injected anywhere along the length of the gas production pipeline legs 22 and 32, although for maximum hydrate protection it is expected that most injection points of hydrates will be soon after the wellhead. Further, it will be understood that it is not necessary that the KHI and THI injection points in the relative positions shown in FIG. 1, for instance, it may be acceptable for the THI to be injected before the KHI, the KHI and THI may be injected simultaneously or at the same point or together. In most situations, a chemical corrosion inhibitor (not shown) is also injected into the pipeline legs near the wellhead.

FIG. 2 presents a similar pipeline system 40 to that of 10 in FIG. 1, except that one of the hydrocarbon production pipeline legs is considerably shorter, where similar or identical components have the same reference numbers. WHP 50 transports its gas via gas production pipeline leg 52 of length $L^1$ which is much shorter than length L of gas production pipeline leg 32, and both join at tie-in point, joint or juncture 42. Besides the physical lengths of pipelines 52 and 32 schematically shown in FIG. 2, the difference in their lengths is also demonstrated by the fact that gas production pipeline leg 52 does not have a "break length" symbol therein (—ʃʃ—) schematically suggesting much greater length. Gas production pipeline leg 52 has injecting into it a KHI via KHI injection equipment 54, where THI injection equipment 56 injects a THI into gas production pipeline leg 52.

Referring to symmetrical gas production facility 10 in FIG. 1, the method in one non-limiting embodiment understands that that both a THI and a KHI are being used on both pipelines 22 and 32, such as would be the case during particularly low temperature situations that would benefit from using the two different types of gas hydrate inhibitors. In a particular non-limiting example described, the THI may be MEG and the KHI may be a hyperbranched compound or a PVCap. In one non-limiting example, the amount of MEG being used ranges from about 1 to about 50 vol %, based only on the water content, that is, the water production rate.

The KHI is being injected at a first amount into both pipelines 22 and 32 via equipment 24 and 34 either before, after or at the same point as the MEG via equipment 26 and 36, at its own first amount (e.g. about 1 to about 50 vol %; alternatively about 0.1 to about 5 vol %; in another non-limiting embodiment from about 0.1 to about 2 vol %, all based on the water production rate), respectively. In the method, the MEG amount injected into line 22 is then at least doubled, or a higher multiple, from its first amount (e.g. from about 2 to about 100 vol %), while at the same time the amount of MEG injected into line 32 is decreased to zero. Again, the increasing and decreasing of hydrate inhibitor injections may be performed gradually or relatively quickly. In one non-limiting embodiment, a gradual decrease or increase may be accomplished by decreasing/increasing the pump rate of MEG and KHI from zero to full rate for 12 hours, and then stabilizing the pump rate for another approximately 12 to about 24 hours. In one non-restrictive version this would mean for KHI a rate of 0.15 vol %/hr for 12 hours for a 2 vol % final injection rate, and for MEG a 4 vol %/hr for 12 hours at 50 vol % final pump rate.

It is expected that in most embodiments, at this point, the MEG injection should be gradually decreased to zero. The KHI proportion injection into line 32 is then at least doubled from its first amount. KHI is continued to be injected into both pipelines 22 and 32 while the MEG injection into pipeline 22 is slowly decreased to zero. The rate of MEG decrease or injection reduction should be effective to not cause hydrate formation in the hydrate-susceptible pipeline 14 until the THI level reaches zero. It has been discovered that the faster the MEG injection is reduced, the greater is the amount of extra KHI needed, whereas if the MEG injection is reduced slowly and gradually, less extra KHI is needed. Finally, the proportion of KHI injected into each pipeline 22 and 32 is decreased until the steady state or equilibrium amount is reached that inhibits hydrate formation in the system, particularly the hydrate-susceptible pipeline 14. It will be appreciated that since the system 10 is symmetrical, the method could be practiced with the increase/decrease in MEG and increase in KHI reversed from that described.

In some embodiments, it may not be necessary to double or increase to at least twice the proportions of MEG and/or KHI in the above-noted steps, but they need to be increased at least above the "normal" or steady-state or equilibrium amounts during continuous production.

Considering the temperature divergence (between the WHPs and the much colder hydrate-susceptible pipeline), the multiphase transition complications and chromatographic effect of the long production pipelines, the key transition stage needs to be long enough to ensure that both the THI and KHI species concentration reaches the required level for hydrate protection. This transition region may be understood to be the length (volume) of pipeline in which the complete transition from using both THI and KHI to the portion where only KHI is used. By "chromatographic effect" is meant the travel speeds along the long pipeline for different ingredients in the KHI products are different, and eventually it takes different time for them to reach the hydrate zone. This is analogous to the movement of the mobile phases or analytes along the stationary phase in chromatography.

In one non-limiting explanation of how the method may operate, it may be that during the relatively warmer season where only KHI is injected, some KHI precipitates and accumulates on the carbon steel pipeline where the temperature is higher than the "cloud point". In most cases, a thin film is formed along the pipeline. When THI is added, the THI flushes out or re-dissolves or solubilizes the accumulated KHI into the pipeline, and sufficient hydrate inhibition is maintained. However, when it is desired to wean the system from having to inject MEG (or other THI), it is more difficult and riskier to simply reduce the amount of MEG. Weaning the multiple tie-in system from MEG may need to take into account this solubilization or re-dissolving of the accumulated KHI active compounds. During the method described herein, the increase in MEG amount may also "flush" or re-dissolve or solubilize accumulated KHI to help transition to only using KHI.

In the asymmetric gas production facility 40 of FIG. 2, the method is similar, to that described above for the symmetrical system 10 of FIG. 1, although care must be taken to ensure that the "first" hydrocarbon production pipeline leg is the shorter one 52. KHI is being injected in first amounts via KHI injection equipment 54 and 34, and MEG is injected in first amounts via THI injection equipment 56 and 36, respectively. The amount of MEG injected by 56 into pipeline 52 may be at least doubled to a second amount (about 2 to about vol 30%) over its steady state or equilibrium first amount (about 1 to about 15 vol %), while MEG injection into pipeline 32 via THI injection equipment 36 is turned off. Next, the amount of KHI injected via equipment 34 into pipeline 32 is increased to a second amount that may be at least twice the first amount, during this time the MEG injected into line 52 by THI injection equipment 56 is reduced slowly, and then the amount of KHI introduced into line 52 by equipment 54 is reduced. The rate at which MEG injection into pipeline 52 is reduced should not cause an increase in the tendency of hydrates to form in hydrate-susceptible pipeline 14. Again, the more slowly that MEG injection into pipeline 52 is reduced, the less extra KHI is needed; if the MEG reduction is relatively more rapid, more extra KHI will be needed. The amounts of KHI injected into both pipelines 52 and 32 by respective equipment 54 and 34 may then reduced to their steady state or equilibrium levels for effective hydrate inhibition during warmer seasons when THI is not required.

In summary, the method should compensate for KHI accumulation so as to maintain the KHI concentration through the pipeline after the LCST is reached. It is particularly important that the ultimate reduction of THI (e.g. MEG) injection into the pipelines is slow and gradual to avoid upsets in production.

It is anticipated that the methods described herein may be used to inhibit both types of pipeline systems depicted in FIGS. 1 and 2, namely ones where the hydrocarbon production pipeline legs are similar or identical in length (FIG. 1) or of different lengths (FIG. 2). Further, the methods herein are expected to be useful for systems with more than two legs tying-in to the same larger pipeline (e.g. 14). In such systems, the THI is increased for the shortest leg tied in to the hydrate-susceptible pipeline, whereas the KHI injection proportion is increased on the other legs tied to the larger, hydrate-susceptible pipeline. The same operational philosophy is expected to apply to system with many different tied-in legs with different configurations—symmetric or not.

In addition to the gas hydrate inhibitor herein, the production fluid may have other additional components injected therein, including, but not limited to, different controlling or inhibiting chemistries such as corrosion inhibitors, wax inhibitors, scale inhibitors, asphaltene inhibitors and other gas hydrate inhibitors and/or solvents. Further, in some non-restrictive embodiments, the methods herein may use anti-agglomerates (AA) together with KHIs in one or more of the steps or injections.

Figure 3:
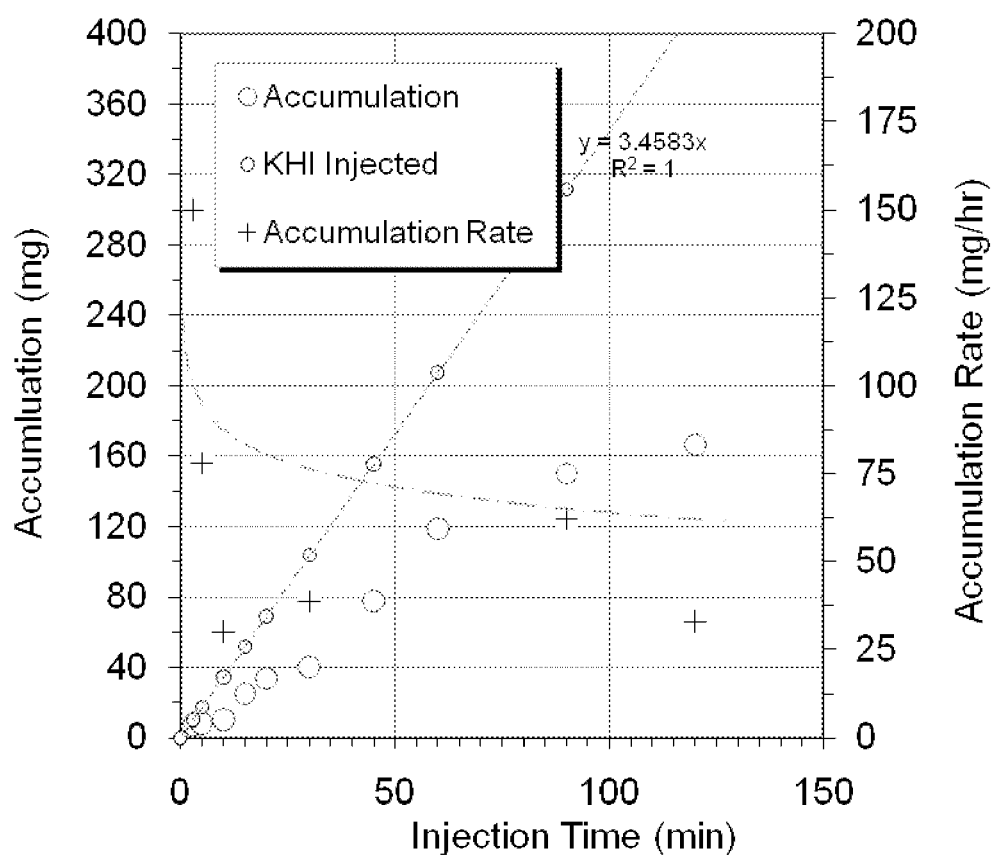
FIG. 3 is a graph of KHI injected into a system where KHI accumulation and KHI accumulation rate are plotted as a function of time.

Presented in FIG. 3 is a graph of KHI injected into a system where KHI accumulation and KHI accumulation rate are plotted as a function of time. The gas temperature was 60° C. and the fluid temperature was 73° C. This graph demonstrates a successful simulation under pipeline production conditions at well-controlled temperatures and a flow regime with the gas to liquid in a volume ratio of 1:4,600.

Figure 4:
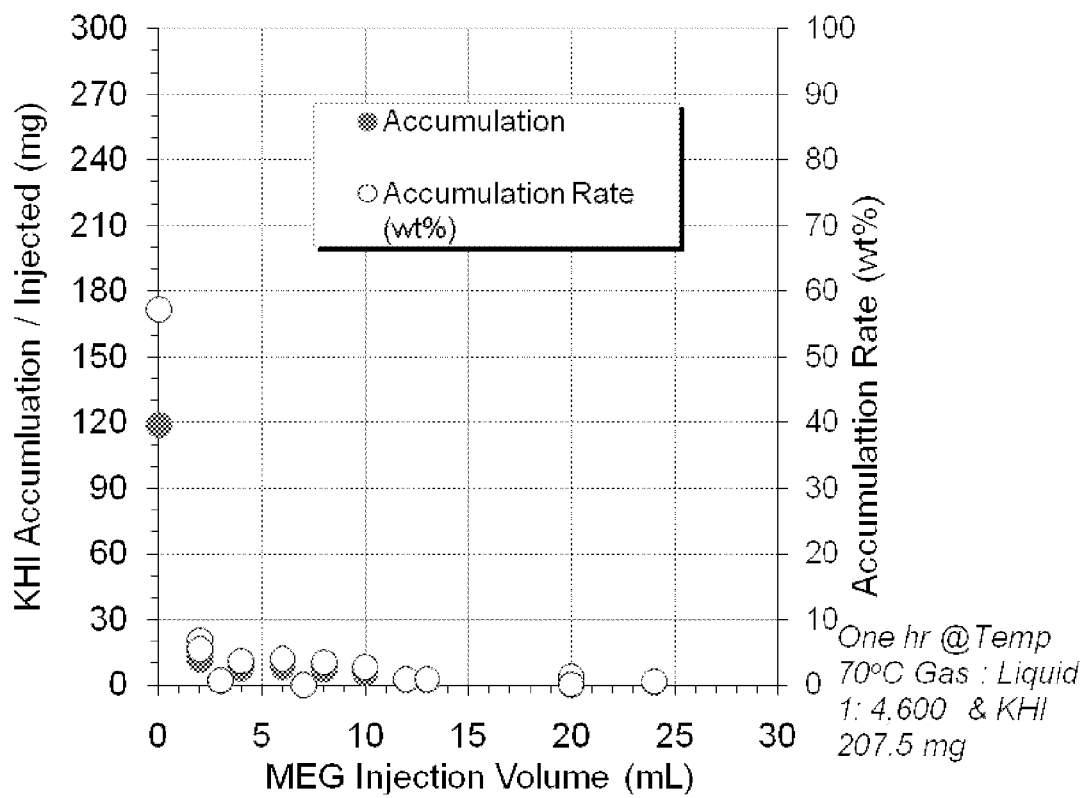
FIG. 4 is a graph where KHI accumulation and KHI accumulation rate are plotted as a function of MEG injection volume.

Presented in FIG. 4 is a graph where KHI accumulation and KHI accumulation rate are plotted as a function of MEG injection volume, for one hour at a gas temperature of 70 C, again where the gas to liquid was in a volume ratio of 1:4,600. The amount of KHI added was 207.5 mg.

The testing presented in FIGS. 3 and 4 is further confirmation of the points discussed previously, namely: (1) KHI is deposited on the pipe wall when the temperature is high, and (2) THI will wash deposited KHI away. The thin film will be reestablished when THI is pulled off, and thus the transition procedure of the present method may be critical.

Many modifications may be made in the apparatus and methods of this invention without departing from the spirit and scope thereof. For example, the exact sequence of steps, hydrate inhibitors used, or proportions used may be different from those described or exemplified, but may still fall within the scope of the invention.

The present invention may suitably comprise, consist or consist essentially of the elements disclosed and may be practiced in the absence of an element not disclosed.

The terms "comprising" and "comprises" as used throughout herein shall be interpreted to mean "including but not limited to".

What is claimed is:

1. A method for transitioning from introducing both a thermodynamic hydrate inhibitor (THI) and a kinetic hydrate inhibitor (KHI) in a hydrate-susceptible pipeline to introducing only a KHI in the hydrate-susceptible pipeline, in a system comprising at least a first hydrocarbon production pipeline leg from a first wellhead to a joint on the hydrate-susceptible pipeline and a second hydrocarbon production pipeline leg from a second wellhead to the same or different joint on the hydrate-susceptible pipeline at a joint, the method comprising:

injecting a first amount of THI into both the first and second hydrocarbon production pipeline legs;

injecting a first amount of KHI into both the first and second hydrocarbon production pipeline legs;

increasing the amount of THI injecting into the first hydrocarbon production pipeline leg to a second amount of THI that is at least twice that of the first amount of THI while ceasing injecting THI into the second hydrocarbon production pipeline leg;

increasing the amount of KHI injecting into the second hydrocarbon production pipeline leg to a second amount of KHI that is at least twice that of the first amount of KHI while reducing the amount of THI injecting into the first hydrocarbon production pipeline leg slowly at a rate effective to not cause hydrate formation in the hydrate-susceptible pipeline until the amount of THI injected is zero; and reducing the amount of KHI injected into both hydrocarbon production pipeline legs until a relatively constant amount is reached that prevents hydrate formation in the hydrate-susceptible pipeline.

2. The method of claim 1 where the first hydrocarbon production pipeline leg is shorter than the second hydrocarbon production pipeline leg.

3. The method of claim 1 where the THI is selected from the group consisting of methanol (MeOH), monoethylene glycol (MEG), diethylene glycol (DEG), triethylene glycol (TEG), propylene glycol (PG), and mixtures thereof.

4. The method of claim 1 where the KHI is selected from the group consisting of dendrimeric compounds, hyperbranched polymers, linear polymers and copolymers, onium compounds, and mixtures thereof.

5. The method of claim 1 where the THI is selected from the group consisting of methanol (MeOH), monoethylene glycol (MEG), and mixtures thereof, and the KHI is selected from the group consisting of dendrimeric compounds, polyvinylcaprolactam (PVCap), and mixtures thereof.

6. The method of claim 1 where the system further comprises at least a third hydrocarbon production pipeline leg from a third wellhead to the same or different joint on the hydrate-susceptible pipeline.

7. The method of claim 1 where the hydrocarbon is natural gas.

8. A method for transitioning from introducing both a thermodynamic hydrate inhibitor (THI) and a kinetic hydrate inhibitor (KHI) in a multiple tie-in hydrate-susceptible pipeline to introducing only a KHI in the multiple tie-in hydrate-susceptible pipeline, in a system comprising at least a first natural gas production pipeline leg from a first wellhead to a joint on the multiple tie-in hydrate-susceptible pipeline and a second natural gas production pipeline leg from a second wellhead to the same or different joint on the multiple tie-in hydrate-susceptible pipeline at a joint, the method comprising:

injecting a first amount of THI into both the first and second natural gas production pipeline legs;

injecting a first amount of KHI into both the first and second natural gas production pipeline legs;

increasing the amount of THI injecting into the first natural gas production pipeline leg to a second amount of THI that is at least twice that of the first amount of THI while ceasing injecting THI into the second natural gas production pipeline leg;

increasing the amount of KHI injecting into the second natural gas production pipeline leg to a second amount of KHI that is at least twice that of the first amount of KHI while reducing the amount of THI injecting into the first natural gas production pipeline leg slowly at a rate effective to not cause hydrate formation in the multiple tie-in hydrate-susceptible pipeline until the amount of THI injected is zero; and reducing the amount of KHI injected into both natural gas production pipeline legs until a relatively constant amount is reached that prevents hydrate formation in the multiple tie-in hydrate-susceptible pipeline, where the THI is selected from the group consisting of methanol (MeOH), monoethylene glycol (MEG), diethylene glycol (DEG), triethylene glycol (TEG), propylene glycol (PG), and mixtures thereof, and the KHI is selected from the group consisting of dendrimeric compounds, linear polymers and copolymers, onium compounds, and mixtures thereof.

9. The method of claim 8 where the first natural gas production pipeline leg is shorter than the second natural gas production pipeline leg.

10. The method of claim 8 where the THI is selected from the group consisting of methanol (MeOH), monoethylene glycol (MEG), and mixtures thereof, and the KHI is selected from the group consisting of dendrimeric compounds, polyvinylcaprolactam (PVCap), and mixtures thereof.

11. The method of claim 8 where the system further comprises at least a third natural gas production pipeline leg from a third wellhead to the same or different joint on the multiple tie-in hydrate-susceptible pipeline.

\* \* \* \* \*